United States Patent
Han

(10) Patent No.: US 7,272,399 B2
(45) Date of Patent: Sep. 18, 2007

(54) METHOD OF RECOVERING DROPPED CALL IN MOBILE COMMUNICATION SYSTEM

(75) Inventor: Chung-Seok Han, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 701 days.

(21) Appl. No.: 09/732,417

(22) Filed: Dec. 7, 2000

(65) Prior Publication Data

US 2001/0021653 A1    Sep. 13, 2001

(30) Foreign Application Priority Data

Dec. 7, 1999   (KR) .............................. 1999-55341

(51) Int. Cl.
   *H04Q 7/20*   (2006.01)
(52) U.S. Cl. ...................... 455/450; 455/436; 455/421; 455/432.1; 370/329; 370/331
(58) Field of Classification Search ................ 455/436, 455/437, 442, 450, 421, 432.1; 370/331, 370/264, 302, 322, 329, 341, 456, 510, 410
   See application file for complete search history.

(56) References Cited

U.S. PATENT DOCUMENTS

| | | | | |
|---|---|---|---|---|
| 5,544,224 A | * | 8/1996 | Jonsson et al. | 455/434 |
| 5,819,171 A | * | 10/1998 | Hoogerwerf et al. | 455/410 |
| 5,943,334 A | * | 8/1999 | Buskens et al. | 370/350 |
| 5,995,830 A | * | 11/1999 | Amin et al. | 455/423 |
| 5,999,816 A | * | 12/1999 | Tiedemann et al. | 455/437 |
| 6,381,455 B1 | * | 4/2002 | Smolik | 455/421 |
| 6,445,918 B1 | * | 9/2002 | Hellander | 455/423 |

OTHER PUBLICATIONS

WO 99/62283 Schroderus, Method for channel use in TDMA system, and TDMA system.*

* cited by examiner

*Primary Examiner*—Charles N. Appiah
*Assistant Examiner*—Nghi H. Ly
(74) *Attorney, Agent, or Firm*—The Farrell Law Firm

(57) ABSTRACT

There is provided a method of recovering a dropped call in a mobile communication system. When a call is dropped, a mobile station determines whether two consecutive good frames have been received on a traffic channel that was disconnected in relation to the dropped call, while searching for an adjacent base station whose signal arrives at the mobile station with a greater received signal strength using a searcher. The mobile station is assigned to a traffic channel by the searched base station using a physical channel used for data transmission and resumes the call on the traffic channel that is available earlier between the recovered traffic channel and the assigned traffic channel.

9 Claims, 3 Drawing Sheets

METHOD OF RECOVERING DROPPED CALL IN MOBILE COMMUNICATION SYSTEM

PRIORITY

This application claims priority to an application entitled "Method of Recovering Dropped Call in Mobile Communication System" filed in the Korean Industrial Property Office on Dec. 7, 1999 and assigned Serial No. 99-55341, the contents of which are hereby incorporated by reference.

BACKGROUND OF THE INVENTION

1. Field of the Invention

The present invention relates generally to a method of recovering a dropped call in a mobile communication system, and in particular, to a device for rapidly recovering a dropped call using a physical channel additionally provided for multimedia services in the future mobile communication system.

2. Description of the Related Art

Conventional CDMA (Code Division Multiple Access) mobile communication technology includes the IS95A/B standards and the JSD-008 standards. According to the standards, if a mobile station declares receipt of 12 consecutive bad frames during decoding, it disables its transmitter. While in this state, if 2 consecutive good frames are decoded, the mobile station enables the transmitter and performs a normal communication. On the other hand, if the mobile station fails to receive 2 consecutive good frames for five second after it disables the transmitter, it releases the communication with a base station.

To recover the dropped call, the user of the mobile station should redial a telephone number. That is, the mobile finds a base station whose signal is received with good quality using a searcher and then establishes a new call through receipt of a synch channel, receipt of a paging channel, access probing, and establishing a traffic channel in sequence for communication with the new base station.

However, a total of ten seconds is allotted to attempt a call recovery after five seconds. This is a long time for a subscriber to wait. Therefore, if consecutive frames are damaged for a predetermined short time (12 or more frames), the mobile station searches its adjacent base stations using the searcher and establishes the new call with the searched base station. FIG. 1 illustrates a conventional procedure of searching adjacent base stations using a searcher in a mobile station when consecutive frames received for a predetermined time are defective.

Referring to FIG. 1, the mobile station determines which base station to communicate with (hereinafter, referred to as a serving base station) in a system determination substate in step 101 and enters a pilot channel acquisition substate in step 102. In the pilot acquisition substate, the mobile station acquires a pilot channel and the short PN code timing of the system. In step 103, the mobile station enters a sync channel acquisition substate. The mobile station receives and demodulates a sync channel message based on the acquired short PN code timing and analyzes the sync channel message to obtain initial system information such as information about its adjacent base stations and timing information. The mobile station then transits to a timing change substate and synchronizes its timing to the system timing in step 104. When an initialization state is over, the mobile station enters an idle state in step 105. While in this state, if a call is initiated the mobile station enters a system access state and attempts to access the serving base station in step 106.

Upon entering a traffic channel initialization substate in step 107, the mobile station requests the serving base station to assign a traffic channel. The mobile station transits to a waiting for order substate in step 108 and then to a waiting for mobile station answer substate in step 109. When the traffic channel is assigned for the call, the mobile station enters a conversation substate to perform the call in step 110. If the call is completed normally, the mobile station releases the traffic channel in a release substate in step 1111 and returns to step 103 for entering the sync channel acquisition substate.

In the conversation substate, the mobile station activates a call drop timer. If a predetermined number of consecutive good frames are not received before the call drop timer expires, the mobile station transits to a waiting for search task report substate and searches for an adjacent base station with the highest signal strength measurement in step 112. If the mobile station acquires the new base station, it transits to the idle state for the serving base station in step 105 and to the sync channel acquisition substate for the new base station in step 103. The mobile station is assigned to a traffic channel by the acquired base station to recover the dropped call. If the call is completed normally, the mobile station transits to the sync channel acquisition substate in step 103. On the contrary, if the dropped call is not recovered but released, the mobile station should return to step 101 to reacquire a base station in the system determination substate.

FIG. 2 illustrates the conventional dropped call recovery procedure in the mobile station. Referring to FIG. 2, the mobile station receives a sync channel and synchronizes its timing to system time in step 201. In step 203, when a call is originated, the mobile station accesses the serving base station and requests the base station to assign a traffic channel. Then, the mobile station is assigned to the traffic channel by the base station in step 205 and performs the call on the assigned traffic channel in step 207. If the call is dropped due to receipt of 12 consecutive bad frames, the mobile station disables its transmitter in step 209.

In step 211, the mobile station performs traffic channel supervision to determine whether 2 consecutive good frames are received for a predetermined time, for example, 5 seconds. If two consecutive good frames are received, the mobile station enables the transmitter and performs the call. Otherwise, the mobile station searches for a base station other than the serving base station, of which the signal is received with an acceptable level of signal strength using a searcher. If the mobile station succeeds in finding the new base station, it gives up communicating with the serving base station, receives in step 213 a sync channel from the new base station, synchronizes its timing to the new base station time, and originates a call in step 215. Then, the mobile station is assigned to a traffic channel by the new base station and recovers the dropped call in step 217.

The above conventional dropped call recovery method, however, has the problem that the mobile station must initiate a call attempt starting from the sync channel acquisition substate for the new base station. In this case, the mobile station releases all physical establishment on the traffic channel in use, for example, releases assignment of a finger receiver and reassigns a finger receiver to the new base station. If the mobile station receives a signal of good quality from the old base station, it fails to perceive the successful receipt of the signal. This implies that despite probable resumption of the call with existing resources, repetition of the traffic channel assigning procedure delays the recovery of the dropped call.

SUMMARY OF THE INVENTION

It is, therefore, an object of the present invention to provide a method of attempting a call to a base station other than a serving base station using a physical channel additionally provided for multimedia service and assigning a traffic channel when a call is dropped in a mobile communication system.

It is another object of the present invention to provide a method of checking whether an abnormally disconnected fundamental channel is recovered, while attempting a call to a base station other than a serving base station on a supplemental channel when a call is dropped and then resuming a call on a traffic channel available earlier in a mobile communication system.

To achieve the above objects, when a call is dropped, a mobile station determines whether two consecutive good frames have been received on a traffic channel that were disconnected in relation with the call drop, while searching for an adjacent base station whose signal arrives at the mobile station with a greater received signal strength using a searcher. The mobile station is assigned to a traffic channel by the searched base station using a physical channel used for data transmission and resumes the call on the traffic channel that is available earlier between the recovered traffic channel and the assigned traffic channel.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention pertains to a method of recovering a dropped call using a physical channel additionally provided for high speed data communication (e.g., a supplemental channel), while maintaining a physical channel established for a call when the call is dropped in the mobile communication system.

In the field of mobile communication, the IS-95 standards primarily focused on voice transmission gives way to CDMA 2000 standards that additionally provide high speed data transmission. Accordingly, the future mobile communication system additionally provides a supplemental channel to support diverse data rates for multimedia services and a common control channel for transmitting control information. In accordance with the present invention, when a call is dropped, the dropped call is recovered using the additional channels (the supplemental channel and the common control channel), while maintaining the physical property of a fundamental channel.

Figure 3:
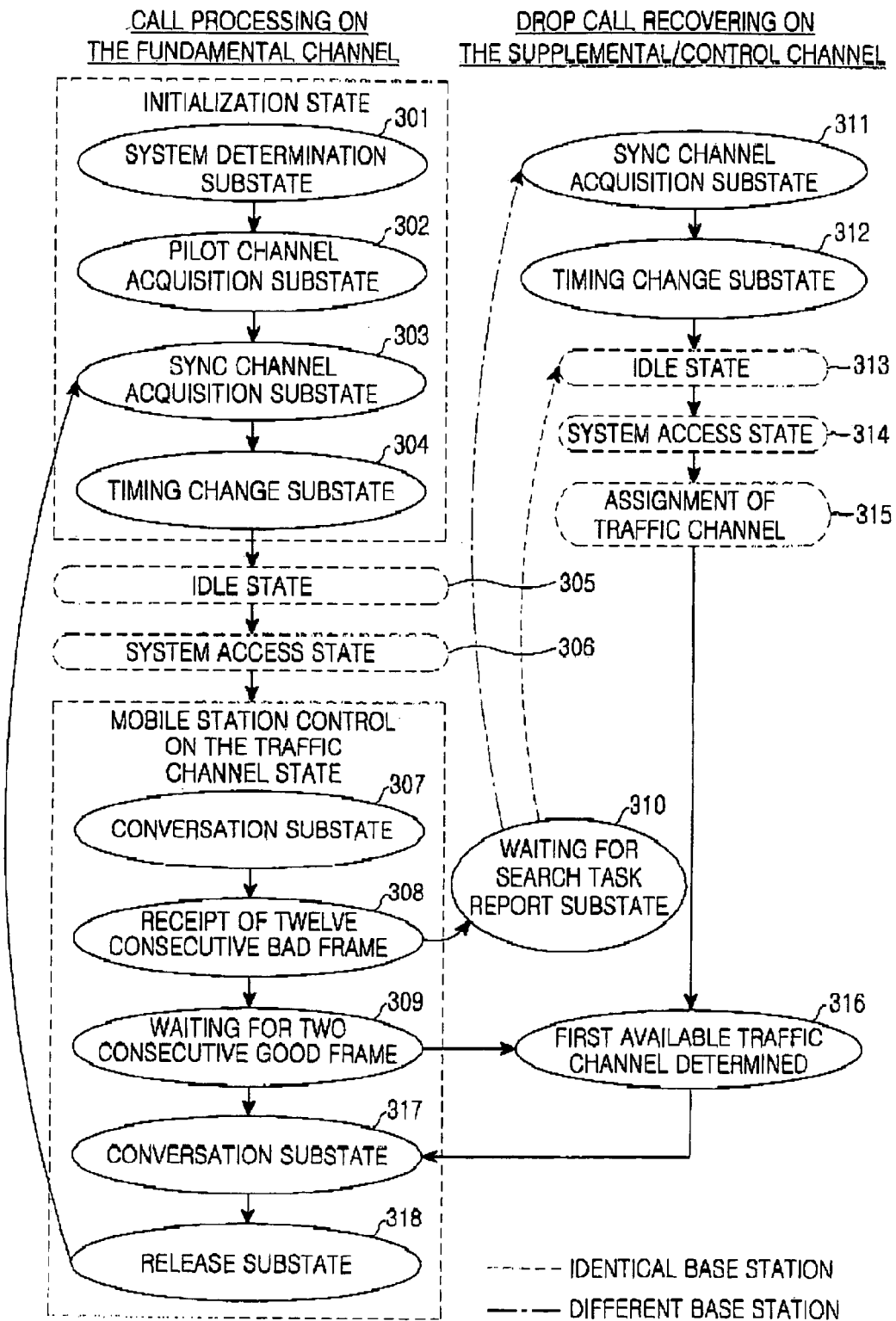
FIG. 3 is a state transition diagram for dropped call recovery in a mobile communication system according to an embodiment of the present invention.

FIG. 3 is a state transition diagram for recovering a dropped call according to an embodiment of the present invention. Referring to FIG. 3, a mobile station determines which base station to communicate with (a serving base station) in a system determination substate in step 301 and enters a pilot channel acquisition substate in step 302. In the pilot acquisition substate, the mobile station acquires a pilot channel and the short PN timing code of the system. In step 303, the mobile station enters a sync channel acquisition substate. The mobile station receives and demodulates a sync channel message based on the acquired short PN timing code and analyses the sync channel message to obtain initial system information such as information about its adjacent base stations and timing information. The mobile station transits to a timing change substate and synchronizes its timing to the system timing in step 304. When an initialization state is over, the mobile station enters an idle state in step 305. While in this state, if a call is originated the mobile station enters a system access state and attempts to access the serving base station in step 306.

When a traffic channel is assigned to the mobile station, the mobile station enters a conversation substate to perform the call on the assigned traffic channel in step 307. The traffic channel is a fundamental channel for voice transmission. If the mobile station receives 12 consecutive bad frames and thus anticipates an upcoming call drop in step 308, it determines whether 2 consecutive good frames have been received on the fundamental channel in step 309. Upon receipt of the two consecutive good frames, the mobile station determines in step 316 the first available traffic channel.

On the other hand, if the mobile station recognizes that the call in progress will be dropped in step 308, it transits to a waiting for search task report substate and searches for an adjacent base station whose signal arrives at the mobile station with the highest signal strength measurement in step 310. If the mobile station acquires the new base station, it transits to the sync channel acquisition substate and receives a sync channel message from the new base station on a supplemental channel or a common control channel that was disconnected from the serving base station in step 311, while the mobile station is placed in the idle state for the serving base station. In step 312, the mobile station synchronizes its timing to the new base station time using the sync channel message. After the idle state in step 313 and the system access state in step 314, the mobile station is assigned to a traffic channel for the call (i.e., a fundamental channel) by the new base station in step 315.

Then in step 316, the mobile station again determines the first available traffic channel. That is, the mobile station determines whether receipt of 2 consecutive good frames on the fundamental channel that were disconnected has occurred earlier than channel assignment from the new base station on the supplemental channel. In either case, the mobile station returns to a conversation substate in step 317. If the call is completed normally, the channel is released in step 318 and the mobile station transits to the sync channel acquisition substate in step 303.

Figure 1:
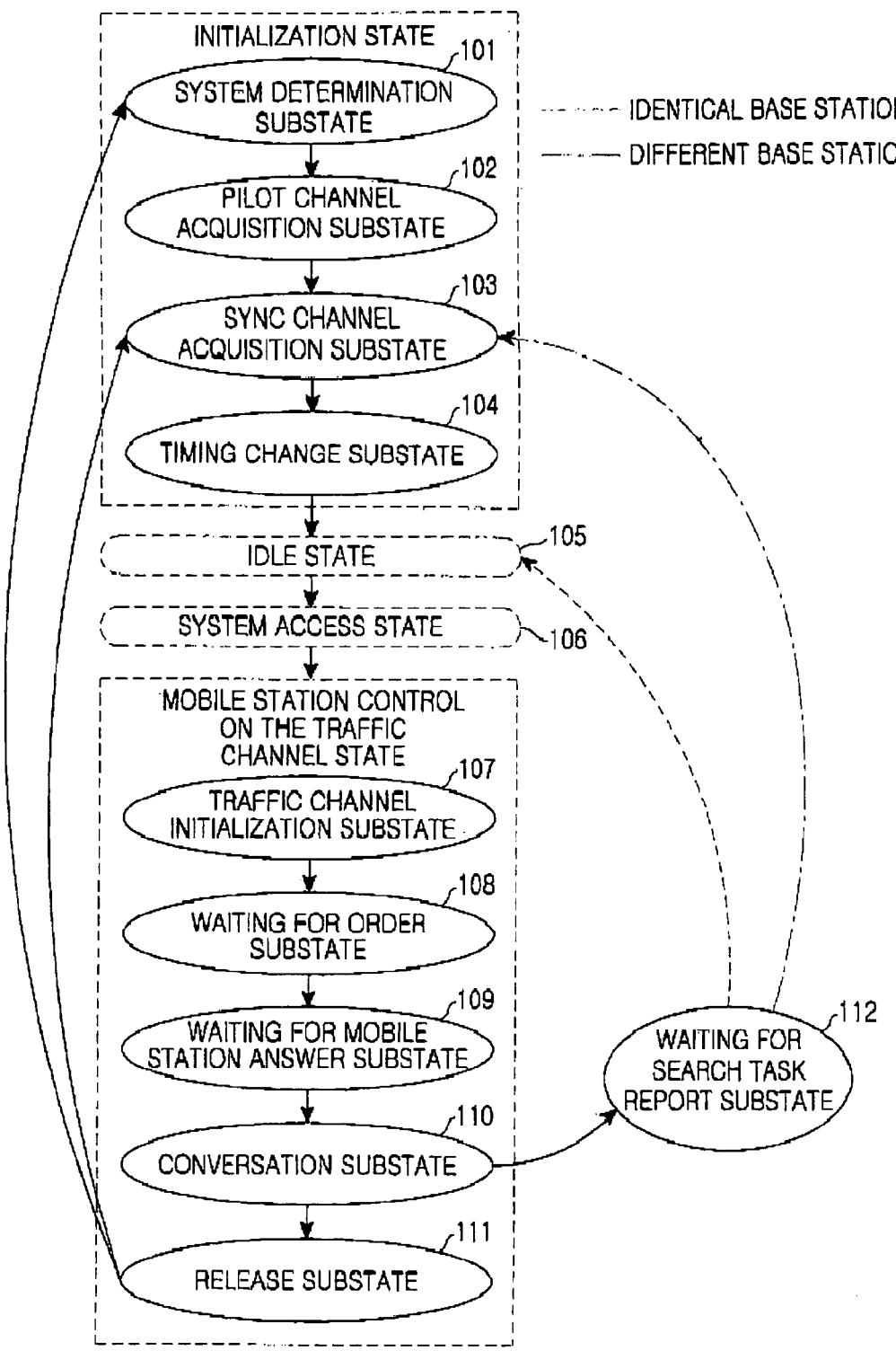
FIG. 1 is a conventional state transition diagram for dropped call recovery in a mobile communication system.
Figure 2:
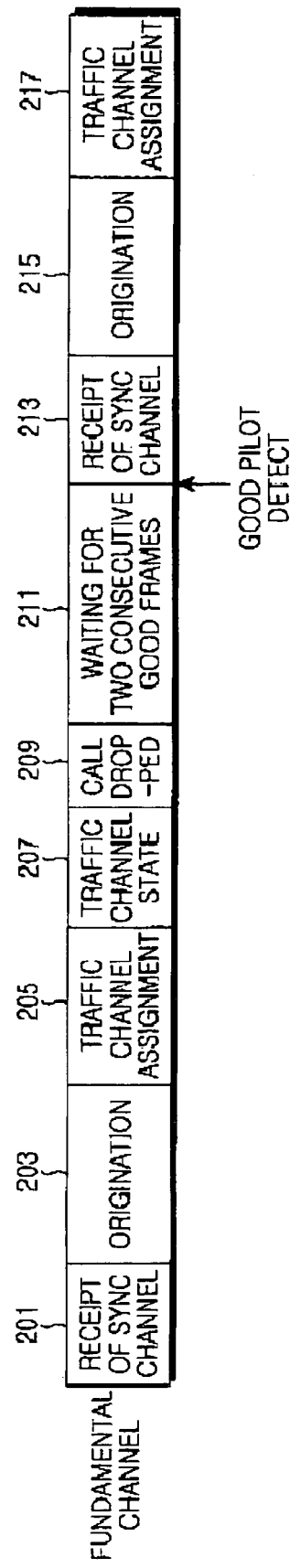
FIG. 2 illustrates a conventional dropped call recovery procedure in a mobile station.
Figure 4:
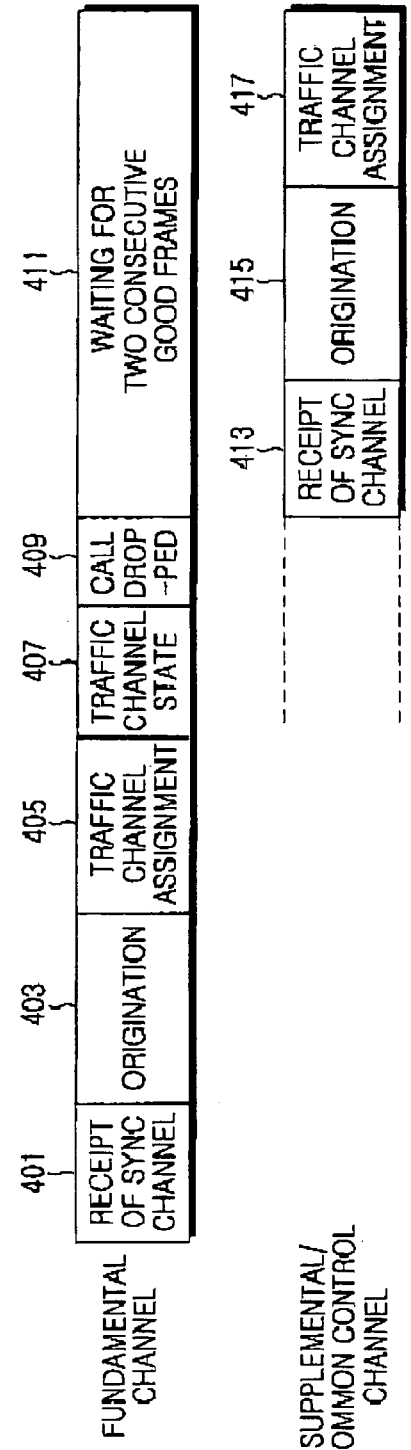
FIG. 4 illustrates a dropped call recovery procedure in a mobile station according to an embodiment of the present invention.

FIG. 4 illustrates the dropped call recovery procedure in the mobile station according to the embodiment of the present invention. Referring to FIG. 4, the mobile station receives a sync channel and synchronizes its timing to system time in step 401. In step 403, when a call is originated, the mobile station accesses the serving base station and requests the base station to assign a traffic channel (a fundamental channel or a supplemental channel). Then, the mobile station is assigned to the traffic channel by the base station in step 405 and performs the call on the assigned traffic channel in step 407. If the call is dropped due to receipt of 12 consecutive bad frames in step 409, the mobile station searches for an adjacent base station whose signal arrives at the mobile station with an acceptable level of reception strength using a searcher and checks whether 2 consecutive good frames have been received on the fundamental channel in step 411.

If the mobile station succeeds in finding an adjacent base station with a greater received signal strength, it receives a sync channel message from the new base station on the supplemental channel or the common control channel which was disconnected and synchronizes its timing to the new base station time in step 413. The mobile station originates a call to be assigned to a traffic channel from the base station in step 415 and is assigned to the traffic channel (a fundamental channel) for the call by the new base station in step 417.

Then, the mobile station determines the first available traffic channel. That is, the mobile station determines whether receipt of 2 consecutive good frames on the fundamental channel that was disconnected has occurred earlier than the channel assignment from the new base station. In either case, the mobile station resumes the call on the corresponding established traffic channel.

While following the conventional dropped call recovery scenario, the mobile station in the present invention searches for an adjacent base station with a greater received signal strength measurement using a searcher immediately after a call is dropped and is assigned to a traffic channel for the call by the searched base station on a supplemental channel (or a common control channel). Specifically, the mobile station receives a sync channel to obtain system information about a paging rate and frequency assignment from the new base station, receives access parameters via a paging channel from the new base station, originates a service, and is assigned to a traffic channel by the new base station. At the same time, the mobile station checks whether 2 consecutive good frames have been received on the fundamental channel. While in this state, if receipt of the 2 consecutive good frames on the fundamental channel occurs earlier than channel assignment from the new base station, the dropped call recover procedure using the supplemental channel or the common control channel is terminated and the call is resumed on the fundamental channel.

As described above, the present invention is advantageous in that a dropped call can be rapidly recovered to any channel environment change because a call is attempted to a base station other than a serving base station using a supplemental channel or a common control channel additionally provided to the future mobile communication system, while the conventional dropped call recovery scenario is also followed.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of recovering a dropped call in a mobile station, comprising the steps of:
    determining whether two consecutive good frames have been received on a traffic channel that was disconnected to determine if the disconnected traffic channel has been recovered when the dropped call occurs;
    searching an adjacent base station whose pilot signal arrives at the mobile station with a greater received signal strength using a searcher, at the same time said determining step is performed;
    requesting a traffic channel to the searched base station so that the traffic channel is assigned to the mobile station, using a physical channel used for data transmission service;
    determining which one of the following occurs first:
        (a) receiving two consecutive good frames through the disconnected traffic channel and recovering the disconnected traffic channel, and
        (b) assigning the traffic channel from the searched base station to the mobile station; and
    shortening call recovery time by resuming the call on the traffic channel that is first available between the recovered traffic channel and the assigned traffic channel according to the determination result.

2. The method of claim 1, wherein the traffic channels are fundamental channels.

3. The method of claim 1, wherein the physical channel for data transmission service is a supplemental channel.

4. The method of claim 1, wherein the physical channel for data transmission service is a common control channel.

5. A method of recovering a dropped call in a mobile station, comprising the steps of:
    determining whether a predetermined number of good frames have been received on a traffic channel that was disconnected to determine if the disconnected traffic channel has been recovered when the dropped call occurs;
    assigning to the mobile station a traffic channel by an adjacent base station with a greater received signal strength using a supplemental channel, while said determining step is performed;
    determining which one of the following occurs first:
        (a) receiving two consecutive good frames through the disconnected traffic channel and recovering the disconnected traffic channel, and
        (b) assigning the traffic channel from the searched base station to the mobile station; and
    shortening call recovery time by resuming the call on the traffic channel that is first available between the recovered traffic channel and the assigned traffic channel according to the determination result.

6. A method of recovering a dropped call in a mobile station, comprising the steps of:
    awaiting recovery of the dropped call while determining whether two consecutive good frames have been received on a traffic channel that was disconnected when the dropped call occurs;
    searching for an adjacent base station whose pilot signal arrives at the mobile station with a greater received signal strength using a searcher while the awaiting step is performed;
    assigning to the mobile station a traffic channel by the searched base station using a physical channel used for data transmission service;

determining which one of the following occurs first:
- (a) receiving two consecutive good frames through the disconnected traffic channel and recovering the disconnected traffic channel, and
- (b) assigning the traffic channel from the searched base station to the mobile station; and shortening call recovery time by resuming the call on the traffic channel that is first available between the recovered traffic channel and the assigned traffic channel according to the determination result.

7. The method of claim 6, wherein the physical channel for data transmission service is one of a supplemental channel and a common control channel.

8. A method of recovering a dropped call in a mobile station, comprising the steps of:
- dropping a call after receipt of a first predetermined number of consecutive bad frames on a fundamental channel;
- determining whether a second predetermined number of consecutive good frames have been received on the fundamental channel that was disconnected to determine if the disconnected traffic channel has been recovered when the dropped call occurs;
- searching for an adjacent base station whose pilot signal arrives at the mobile station with a greater received signal strength using a searcher, while said determining step is performed;
- acquiring system information by receiving and demodulating a sync channel from the searched base station;
- requesting a traffic channel to the searched base station so that the traffic channel is assigned to the mobile station;
- determining which one of the following occurs first:
  - (a) receiving two consecutive good frames through the disconnected traffic channel and recovering the disconnected traffic channel, and
  - (b) assigning the traffic channel from the searched base station to the mobile station; and
- shortening call recovery time by resuming the call on the channel that is first available between the recovered fundamental channel and the assigned traffic channel according to the determination result.

9. A method of recovering a dropped call in a mobile station, comprising the steps of:
- determining whether two consecutive good frames have been received on a traffic channel that was disconnected in relation to the dropped call;
- searching an adjacent base station whose signal arrives at the mobile station with a greater received signal strength using a searcher, while the frame receipt is checked;
- requesting a traffic channel, at mobile station, to the searched base station;
- assigning to the mobile station a traffic channel by the searched base station using a physical channel used for data transmission;
- determining which one of the following occurs first:
  - (a) receiving two consecutive good frames through the disconnected traffic channel and recovering the disconnected traffic channel, and
  - (b) assigning the traffic channel from the searched base station to the mobile station; and
- shortening call recovery time by resuming the call on the channel that is first available between the recovered traffic channel and the assigned traffic channel according to the determination result.

* * * * *